US006632537B2

(12) United States Patent
Shores

(10) Patent No.: US 6,632,537 B2
(45) Date of Patent: Oct. 14, 2003

(54) SILICONE AND IONICALLY MODIFIED ISOCYANATE ADDUCT

(76) Inventor: A. Andrew Shores, 212 Carroll Canal, Venice, CA (US) 90291

( * ) Notice: Subject to any disclaimer, the term of this patent is extended or adjusted under 35 U.S.C. 154(b) by 2 days.

(21) Appl. No.: 09/870,001

(22) Filed: May 29, 2001

(65) Prior Publication Data

US 2003/0032726 A1 Feb. 13, 2003

Related U.S. Application Data

(60) Provisional application No. 60/261,731, filed on Jan. 17, 2001.

(51) Int. Cl.[7] ................................................. B32B 9/04
(52) U.S. Cl. .................. 428/447; 528/44; 525/479; 525/474; 106/31.13; 106/287.1; 8/128.3; 427/208.4; 427/371
(58) Field of Search ............................ 528/44; 525/474, 525/479; 106/31.13, 287.1; 8/128.3; 427/208.4, 371; 428/447

(56) References Cited

U.S. PATENT DOCUMENTS 3,607,375 A * 9/1971 Wiejak

FOREIGN PATENT DOCUMENTS

GB           1128642      * 9/1968

* cited by examiner

Primary Examiner—Robert Dawson
Assistant Examiner—Kuo-Liang Peng

(57) ABSTRACT

Reaction product of a composition comprising in admixture a polyisocyanate, a silicone having dimethylsiloxane segments containing one or more isocyanate-reactive group, a reactant containing one or more of an isocyanate-reactive group and one or more ionizable group, optionally an organic substance having one or more isocyanate-reactive groups and no ionizable group, and compound providing counterion for said ionizable group, wherein either the silicone, or the reactant, or both, have a single isocyanate-reactive group.

30 Claims, No Drawings

SILICONE AND IONICALLY MODIFIED ISOCYANATE ADDUCT

CROSS REFERENCE TO RELATED APPLICATIONS

This application claims the benefit of copending U.S. Provisional Application serial No. 60/261,731, entitled "Silicone-Modified Urethane Oligomer, filed Jan. 17, 2001, the teachings of which are incorporated by reference."

BACKGROUND OF THE INVENTION

1. Field of the Invention

This invention discloses a water-reducible isocyanate adduct having dimethylsiloxane segment and ionic group. Emphasis is being placed on the use of the compound as release coating in adhesive-coated products as well as a process for creating adhesive tapes and labels.

2. Description of the Prior Art

A pressure-sensitive adhesive tape is generally manufactured and sold with the tape wound upon itself in convolutions to form a roll of some suitable length of tape. Consequently, when it is necessary to use the tape, it must be possible to unwind the desired length from the roll without excessive force or delaminating of the backing, offsetting of the adhesive, or the like, regardless of the time or conditions under which the tape has remained in roll form prior to use. For these reasons, a coating known as a release coat or backsize is generally provided on the backside of the tape backing member, i.e., the side opposite that on which the adhesive mass is applied. Such a coat, compared to an uncoated backing member, as is its objective, offers relatively low adhesion to the adhesive mass.

Although various release agents and compositions thereof have been developed over the years, none of them, to my knowledge, accomplishes all the objects desired by their use. With some release agents, the release characteristics diminish with time, and particularly at high temperatures, because of some chemical or physical change in the release material per se. Others interact with the adhesive mass so that adhesion to various substrates to which the tape is applied is adversely affected.

Whether a material is suitable or not as a release agent, in particular for pressure-sensitive adhesive tapes, depends upon a number of factors. The lower the interfacial tension between the adhesive mass and the material used as a release coating, naturally the better release provided. However, low interfacial tension alone is not enough. The material, to be useful as a release coat, should also be of a suitable cohesive strength and possess good adhesion with the backing member.

In the 1970's, silicone emulsions in water were introduced. Generically, they were dimethylsiloxane oligomers with Si—H reactive groups. They had to be mixed with a catalyst prior to application to paper or plastic film, which made them inconvenient 2-component systems. Upon evaporation of water, a surface film of the oligomer was deposited, which built up in molecular weight, crosslinked, and a solid coating resulted. This process, called "cure", needed either high temperatures or long time at moderate temperatures.

The necessity for curing the polymeric material after deposition has placed certain restrictions on the use of silicones. This is because the temperature needed for curing, at least to the extent desired, has often exceeded the temperature, which a substrate on which a release coating is deposited could withstand. This has been particularly true where the substrate is a thermoplastic film or a paper-thermoplastic film laminate, care being needed to avoid melting or distorting the thermoplastic film. In paper substrates, high temperatures result in over-drying of paper.

A further disadvantage associated with silicone release polymers is their relatively poor adhesion to certain plastic films on which they are coated. This poor adhesion is thought to be due to the scarcity of polar groups in the silicone. Consequently, the use of a primer is often needed to obtain better anchorage of the silicone film to the substrate. In addition, the release characteristic in itself is sometimes a problem in that too good a release is provided. Thus, tape rolls may be too easy to unwind and, in some cases, the adhesion between the adhesive mass and release coat may be so low that the roll doesn't remain tightly wound.

U.S. Pat. No. 4,287,109 of Schlak et al. discloses an aqueous resin of a Silicone-Si—O—C-Polyester block copolymer.

B.P. 1,128,642 of Keberle et al. and G.P. DE 37 30 780 A1 of Nagorski et al. disclose water base silicone-modified polyurethanes. Keberle suggests their use for impregnating and coating fabrics, leather, paper, glass, wood, laminates and foamed plastics for anti static finishes and hydrophobic coatings, and as binder, lubricant, mold release agent, cleaning agent, leveling agent and corrosion inhibitor. Nagorski suggests usage as coating for wood, metal, paper, synthetic fabric, flock and leather.

EPA 0 342 826 of Higgins and its corresponding U.S. Pat. No. 5,082,704 disclose a silicone-modified polyurethane dispersion in water which may be used to fabricate a release liner for adhesives, most notably for asphalt roofing materials.

EPA 0 380 236 A2 of Leir discloses a diamine-terminated silicone, the preparation of ionically-modified silicone-polyurea from ingredients having "a high degree of difunctionality with little contamination from monofunctional . . . impurities . . . " which "inhibit the chain extension reaction and limit the attainment of optimum molecular weight, and thereby optimum tensile strength of the polyurea", and its use as an elastomer, a pressure sensitive adhesive and a low adhesion backsize.

My own inventions, U.S. Pat. Nos. 5,356,706 and 5,543,171, disclose processes for manufacturing aqueous release coatings for pressure sensitive adhesive tapes by reacting a siloxane oligomer having 2–3 isocyanate-reactive groups and a diol having an acidic group with an excess polyisocyanate, and further reacting, in water, with a tertiary amine to form a salt and a primary or secondary polyamine to extend the prepolymer into a polymeric chain.

U.S. Pat. No. 5,679,754 of Larson et al. disclose fluorinated polyurethane with sulfonate groups as release agent dispersion in water.

U.S. Pat. Nos. 5,750,630 and 6,072,019 of Sengupta disclose a "polyurethane polymer whose chain includes silicone-containing segments and whose polymer chain is end-capped with a single isocyanate-reactive silane group" and a 2.5–30 weight percent solution in water of the polyurethane.

The Encyclopedia of Polymer Science and Engineering (Vol. 10, P.432) reports the definition of an oligomer by the International Union of Pure and Applied Chemistry (IUPAC) as "a substance composed of molecules containing a few of one or more species of atoms (constitutional units) repetitively linked to each other." A polymer, on the other hand, is characterized by the repetition of a great number constitutional units, or monomers. The average number of monomers per molecule, also referred to as average degree of polymerization (DP), is about 3–50 for an oligomer and about 50–1,000 for polymers. The "number-average molecular weights ($M_n$) of commercial polymers usually lie in the range of 10,000–100,000" (Textbook of Polymer Science, Third Edition, Fred W. Billmeyer, Jr., Ed., p. 17) with weight-average molecular weights ($M_w$) being 2.5–5 times higher.

Condensation polymers, such as polyurethanes, are synthesized by stepwise polymerization. In order to obtain good physical properties, such as tensile strength, elasticity and cohesive strength, which prevents transfer to the pressure sensitive adhesive in tape and label applications thus detackifying the adhesive, they are prepared from polyfunctional reactants in close stoichiometric proportions to build long polymeric chains containing monomeric units in excess of 50 and $M_w$ in the 20,000–120,000 ranges. The use of monofunctional monomers is avoided since they to produce low molecular weight products, which generally results in poor physical properties. Thus, in the preparation of prior art polyurethanes all the monomers are polyfunctional and they are present in stoichiometric proportions to obtain high DP and $M_w$. Sengupta's polyurethane also includes a minor stoichiometric amount, 3–6%, of a monofunctional silane, but "the molecular weight of the polymer is not found to be critical, but polymers having weight average molecular weight in the range of from about 20,000 to about 120,000 are found to be suitable" (U.S. Pat. No. 6,072,019, p.4, 1.3–6). The polymers obtained were of high $M_w$ and their concentrations in solution or dispersion was 26–37%, only slightly higher than those of my previous inventions, 27–31%. Higher polymer concentrations would yield too high, impractical, solution viscosities.

SUMMARY OF THE INVENTION

A new coating can be prepared from polyisocyanates and compounds bearing isocyanate-reactive groups at least one of which having a single isocyanate-reactive group. The reaction product is an isocyanate adduct, or a mixture of isocyanate adducts, one or several oligomers, and may have urethane/urea/amide bond. For simplicity the reaction product, which is one object of this invention, is hereon referred to as isocyanate adduct, urethane or urethane oligomer. It has many advantages as coating material over the prior art polymeric urethanes. Examples of coatings are release agents for pressure sensitive adhesive tapes and labels. Other examples are mold release agents, finish materials for fibers, fabrics or paper products, overprint varnishes, printing inks and write-on office products, such as note pads coated with a pressure sensitive adhesive.

This invention comprises the reaction product of a composition comprising in admixture:

A. Polyisocyanate,

B. Silicone having dimethylsiloxane segment and one or more isocyanate-reactive group, C. Reactant with one or more isocyanate-reactive group and one or more ionizable group, and D. Optionally organic substance having one or more isocyanate-reactive group and no ionizable group, and E. Compound providing counterion for said ionizable group; and wherein either silicone B, or reactant C, or both, have a single isocyanate-reactive group.

This invention further discloses a process for manufacturing a pressure sensitive adhesive-coated product comprising the steps of:

i. providing the reaction product of a composition comprising in admixture dissolved in a water-soluble solvent:

A. Polyisocyanate,

B. Silicone having dimethylsiloxane segments and one or more isocyanate-reactive group, C. Reactant with one or more isocyanate-reactive group and one or more ionizable group, D. Optionally organic substance having one or more isocyanate-reactive group and no ionizable group, and E. Compound providing counterion to said ionizable group; and wherein either silicone B or reactant C, or both, have a single isocyanate-reactive group, ii. mixing with water to form dilute solution or dispersion, iii coating a flexible substrate with said solution or dispersion and removing water and said solvent, and iv. coating said substrate with a pressure sensitive adhesive.

If a dilute solvent solution of the adduct is desired the compound E may be omitted and the mixing in step ii is carried out with a solvent to form a dilute solution.

The new urethane compound of this invention has a number of advantages over the prior art polyurethanes:

It provides easier release than the prior art release agents at the same silicone concentration in the molecule The concentration of the expensive silicone moiety, which is part of the release agent, can be reduced by a factor of 2–4, or more, while maintaining the same release properties The adduct can be prepared and applied to tape backings either from solvent or water It can be manufactured in one reactor, instead of two, as my said previous polymeric release agents It needs not contain expensive silanes, as Sengupta's polyurethane does It can be manufactured and shipped at twice the active ingredient concentration level than that of prior art release agents, thus leading to the benefits of Lower manufacturing cost per unit weight of release agent Half as many containers, e.g. drums, are necessary to inventory, ship to tape manufacturers, store and finally dispose of, all of which is costly.

In this invention the practical total solids concentrations in solutions or dispersion can be as high as 40%, even 50–65%, and higher, without excessive viscosity build-up. The product can also be prepared at the melt without solvent.

A dilute aqueous, or solvent solution, or dispersion, of the oligomer can be coated onto various substrates without need for any further chemical buildup for their functioning as a film forming coating. It needs not be subjected to curing. It offers good adhesion to various substrates, particularly to those used conventionally as backing members in pressure-sensitive adhesive tape manufacture. In spite of its low DP and $M_w$ the oligomer provides consistent release, even with aggressively tacky adhesives, without transfer to the adhesive, which would result in detackification.

The compound of this invention is characterized by a combination of properties not found in either moiety alone. The silicone portion contributes release from pressure sensitive adhesive, water repellency, oil repellency, and low friction. The polar groups provide good adhesion, without need for a primer, between the coating and various substrate materials. These divalent polar groups, e.g. carbamate, urea, thiocarbamate, as well as aromatic and ionic groups increase the glass transition temperature and render the compound solid, cohesive and high temperature melting when they are present in sufficient amount. In addition, the ionic groups provide water solubility.

Satisfactory release properties in some applications can be obtained by blending a minor quantity of the adduct of this invention with a major proportion of a polymeric film former. It is surmised that during the coating process the adduct blooms to the surface and the coating exhibits properties of the compound of this invention.

DETAILED DESCRIPTION OF THE INVENTION AND PREFERRED EMBODIMENTS

The silicone segment in the adduct of this invention is introduced into the molecule by a compound having dimethylsiloxane segment and one or more isocyanate-reactive group. Preferably, the isocyanate-reactive group is bonded to said segment through an intermediate divalent organic group, such as alkylene, alkyleneoxy, or polyester, with Si—C linkage. Unlike the Si—O—C linkage, the Si—C bond provides hydrolytic stability. The dimethylsiloxane segment may be part of the main chain, or side chain. The number of dimethylsiloxane units per reactant molecule is generally 50, or less, in most cases 1–25. Preferred silicone-containing compound of this invention are hydroxyl, thiol, amino and carboxyl functional. The isocyanate-reactive groups may be placed either at the end of the molecule, or side chain. An example of a series of such reactants have alkylene, alkyleneoxy, and their combination, such as —(CH$_2$)$_3$—O—(CHRCH$_2$O)$_n$H termination with R=H or CH$_3$ and n=0–50 preferably 5–20.

The other compound reacting with isocyanate has two different functionalities: one or more ionic or potential ionic group, either anionic or cationic, and one or more isocyanate-reactive group. Example of compounds with ionic or potential anionic groups are: hydroxyacetic acid, aminoacetic acid, 2,2'-dimethylol propionic acid, tartaric acid, lysine, N-2-aminoethyl-2-aminopropionic acid, N-2-aminoethyl-2-aminoethane sulfonic acid, the propoxylated adduct of 2-butene-1,4-diol with sodium bisulfite, N-2-aminoethyl-2-aminoethane phosphonic acid.

Another group of anionic compounds capable of reacting with the polyisocyanate is the reaction product of a cyclic anhydride with a multifunctional compound having one or more group capable of reacting with the anhydride and one or more group capable of reacting isocyanate. The multifinctional compound may be a polyamine, polyol, amino alcohol, amino acid and hydroxyacid. Examples of anhydrides are phthalic anhydride, hydrogenated phthalic anhydride, methyltetrahydro phthalic anhydride and succinic anhydride. The reaction product may be an amide or ester having a carboxyl group and one or more group capable of reacting with the isocyanate. Preferred multifunctional compounds are aminoalcohols, such as diethanol amine, diisopropanol amine, and 2-amino-2-ethyl-1,3-propanediol.

Counterions for acids are bases, such as ammonia, potassium hydroxide, triethylamine, N,N'-dimethylpropylamine, N-methyl-di-(2-ethanol)amine, N-methylmorpholine, ethanolamine and ethylene diamine. Volatile amines, such as lower alkyl amines, aminoalcohols and ammonium hydroxide are preferred.

Examples of suitable cationic groups in compounds also having isocyanate-reactive groups are —NHR$_2$$^+$X$^-$ or —NR$_3$$^+$X$^-$ wherein X may be a soluble anion, such as halide, hydroxide or carboxylate and R may be a alkyl, cycloafiphatic or aryl group with 1–6, preferably 1–4 carbon atoms. Examples of compounds providing the positively charged part of the formula are tertiary amines and polyamines having primary amine groups and a secondary amine group, such as diethylene triamine. Examples of negatively charged counterions to the amine group are ethyl bromide, 2-chloroacetamide, acetic acid and dimethyl sulfate, which form with said amines tertiary or quaternary ammonium salts.

Nonionic hydrophilic groups, such as hydroxyl, polyoxyethylene and oxypropylene segments are often part of the adduct composition. They may be bonded to the silicone or introduced into the urethane oligomer of this invention by the reaction of a molecule having polyethylene glycol or polypropylene glycol segments with the isocyanate. However, their concentration should be limited since they tend to increase the water sensitivity of the urethane.

Any of the polyisocyanates heretofore used for the formation of polyurethanes are suitable for the purposes of the present invention although diisocyanates and triisocyanates are preferred. Those diisocyanates, which can be used in the practice of the invention, in general, include aromatic, aliphatic and cycloaliphatic diisocyanates. In addition, mixtures of two or more species, kinds and types of the isocyanate functional component can be employed.

Examples of polyisocyanates that can be employed in the instant invention include toluene-2,4-diisocyanate, a mixture of toluene-2,4- and toluene-2,6-diisocyanate, metaphenylenediisocyanate, methylene-bis-2,4- and 2,6-phenylisocyanate (MDI), hydrogenated MDI, isophorone diisocyanate, tetramethyl-m-xylylene diisocyanate and polymeric MDI's, which are mixtures of di- and triisocyanates based on MDI. Isocyanate terminated prepolymers can also be used as well as mixtures of isocyanates with average fractional values of isocyanate functionality. In the broad context of the present invention, it will be appreciated that polyisocyanates also include those compositions that provide requisite isocyanate functionality within the polyisocyanate composition to react with both components B and C as herein described.

The nature and amount of the reactants determine the degree of release from pressure-sensitive adhesives. Prior arts reported that higher silicone content, without upper limit, in the urethane polymer results in better release. Thus, high silicone-content polyurethanes were commercialized, at great expense, to satisfy many demands. In contrast, the adduct of this invention attain excellent release values at low silicone levels, 5–10%, and further increase in silicone content levels off the release value. Other characteristics attributed to silicones, such as slip, and hydrophobicity is in the same line. Practically, the dimethylsiloxane content in the capped isocyanate of this invention for most applications is 1–10% and rarely exceeds 20%.

The proportion of polyisocyanate, providing hard segments for the copolymer, is generally in the range of 15–60%, and most are in the range of 30–45%.

The amount of reactant having isocyanate-reactive group and acid or amine group is also important since it provides dispersibility and solubility through the ionic groups. Useful amounts of carboxyl content in the copolymer were found to be in the range 20–300 mEq./100 g of urethane. Lower amounts are not enough to disperse or solubilize the urethane oligomer in water while higher ones render the coating water sensitive. The preferred range is 60–200 mEq./100 g. The ionic strength of sulfonic acid and phosphonic acid groups is much higher than that of the carboxylic acid group. Consequently, considerably lower amount of these anionic groups are required to solubilize the urethane in water. The amount of the cationic compound depends on the number carbon atoms in the molecule and the amount of nonionic hydrophilic groups but their proportion should be sufficient to disperse or solubilize the adduct in water.

The functionalities of the ingredients B and C may be combined to provide both isocyanate-reactive groups and ionizable groups. One of the techniques to prepare such products is to react a silicone having dimethylsiloxane segments and more than one isocyanate-reactive groups, such as hydroxyl, primary amino, secondary amino, carboxyl and thiol, with a stoichiometrically defective amount of a compound providing ionizable groups to the molecule as a consequence of reaction with said silicone, but leaving one or more of the isocyanate-reactive groups unreacted. For example, to introduce carboxyl functionality into hydroxyl or amino functional silicones, it may be reacted with polyacids and their derivatives, such as esters. Cyclic anhydrides are particularly effective. Carboxyl functional silicones may be reacted with polyols, polyamines and aminoalcohols. Cationic groups may be introduced by reacting carboxyl functional silicones with a compound having both hydroxyl and tertiary amine functionalities. All these reactions take place under mild conditions, from ambient with anhydride to 60° C., up to 120° C., depending on the nature of the reactants, catalysts used and other parameters. Thus, this invention also comprises the reaction product, preferably water-soluble or watter-dispersible, of a composition comprising in admixture:

A. Polyisocyanate and
B. Silicone having dimethylsiloxane segment, one or more isocyanate-reactive groups and one or more ionizable group optionally ionized with a compound providing a counterion other than hydrogen.

The synthesis to form urethane of this invention is preferably carried out in two steps. In the first stage of the reaction, an isocyanate terminated compound is formed by reacting the silicone containing compound and a potential ion-containing monomer with a stoichiometric excess of a polyisocyanate. This reaction may be carried out neat or in the presence of a solvent to reduce viscosity. Heat or catalyst may be used to speed up the reaction, although mild reaction conditions, generally below 80° C., are preferable to avoid side reactions. Suitable inert, aprotic, solvents may be used to reduce the viscosity. Examples of such solvents are N-methyl-2-pyrrolidone, acetone, methyl acetate and propyleneglycol methylether acetate, and their mixture.

As the reactions are exothermic, it may be only necessary to mix the various components together and allow the temperature to rise to the exotherm temperature and further adjusting the temperature with or without external heating or cooling. The reaction is conducted under anhydrous conditions for such a time at the selected temperature that is practical to provide the desired results.

The quantity of organic polyisocyanates to be used in the invention is dependent upon the quantity of active hydrogen groups in the monomer and oligomer, the particular isocyanate compound used, the molecular weight of the isocyanate, the isocyanate (NCO)/isocyanate-reactive group ratio, etc. All of these factors, while influencing the amount of polyisocyanate to be used are easily taken into account by one skilled in the art to determine the precise amount of NCO groups required in any particular formulation. The initial stoichiometric ratio of NCO to the sum of isocyanate-reactive groups in the practice of this invention is generally between about 1.2 and 4, preferably 1.4–2.5 and most preferably 1.5–2. Lower ratios may increase the viscosity, which may be difficult to handle, and increases the solvent demand, while higher ones may decrease the compound's solubility and create excessive foaming if it is further reacted in the presence of water.

If desired, catalysts that are normally used to accelerate the NCO reaction can be employed in the instant invention, particularly with aliphatic isocyanates. The use of a catalyst is particularly useful to accelerate the secondary OH/ortho-NCO reaction, the SH/NCO and the COOH/NCO reactions. These catalysts include tertiary amines such as triethylamine, tributylamine, pyridine, N-methylmorpholine, and organometallic compounds such as stannous octoate, dibutyl tin dilaurate, zinc octoate and cobalt naphthenate.

The NCO terminated compound thus prepared is then capped either with said silicone B, reactant C or substance D. Examples of substance D are amines, alcohols, aminoalcohols, ammonia and carboxylic acids, such as methanol, propyleneglycol, methoxypropanol, dipropyleneglycolmonomethyl ether, water, morpholine, propylenediamine, adipic acid, hydroxyacetic acid, and lysine.

The isocyanate-terminated compound may also be reacted in aqueous medium with either water itself or a stoichiometric excess polyamine in the presence of a volatile tertiary amine. In most cases, the amines are dissolved in water and the organic phase is poured into it while stirring vigorously. Another option is to neutralize the potential anionic groups first with a tertiary amine followed by chain extension with water. This method is particularly useful with aliphatic isocyanates.

The average degree of polymerization, DP and weight average molecular weight, $M_w$ can be regulated by the initial stoichiometry of the reacting monomers. In general the higher the NCO/OH the lower the DP and $M_w$ of the prepolymer. At the capping stage of the prepolymer with the isocyanate-reactive monomer, the larger its stoichiometric excess, the lower is the DP and $M_w$ of the urethane. Carother's equations, reported in Principles of Polymerization, third Edition, by Georges Odian, Ed., p. 110–111, quantify these relationships:

$$DP=2/(2-f_{avg})$$

and $$M_w=\text{SUM}(w_i M_i(DP))$$

where $f_{avg}$ is the average functionality of the monomers, $w_i$ is the weight fraction of the monomer i and $M_i$ is molecular weight of the monomer i. For stoichiometrically balanced reaction mixtures:

$$f_{avg}=\text{SUM}(N_i f_i)/\text{SUM}(N_i)$$

where $N_i$ is the number of molecules of monomers i with functionality $f_i$. For nonstoichiometric mixtures, such as prepolymers and large stoichiometric excess of multifunctional isocyanate-reactive monomers, the formula is $$f_{avg}=2(\text{Total Number of Functional Groups that Are Not in Excess})/\text{SUM}(N_i).$$

This invention may provide a product with DP of about 3–50, preferably about 4–20, and most preferably about 4–10. Its $M_w$ may be about 600–20,000, preferably about 800–10,000 and most preferably about 1000–5000. Its total solids in solution, or dispersion, are 40% or more and preferably 50% or more. It is thus appreciated that the DP and $M_w$ depend on the functionality, molecular weight and weight proportion of the monomers and they can be readily adjusted by the use of the above equations to yield the product of this invention. One of ordinary skilled in the art will recognize that other equivalent parameters may also apply. It is also recognized that the said the reaction product may comprise compositions comprising various combinations and permutations of monomers, such as ABC, ABCD, AB, ABD, AC and ACD.

The solvent or water solution, or dispersion, of the urethane oligomer of this invention can be diluted further with water to provide a solution of the desired concentration, for example 0.25 to 5% by weight solids, for coating. It can be cast on a substrate and the water is evaporated, thereby casting a thin film of the adduct on the substrate. No crosslinking is necessary to obtain functional properties. A fast drying water-miscible solvent, such as isopropyl alcohol, may be added, if desired, to improve drying speed.

One of the advantages of this invention is that it effectively doubles the solids content on preparation. This makes it easier to prepare a neat (100% active) product by solvent evaporation, such as spray drying or oven drying. The neat product is less costly to transport from the manufacturing plant to the tape processing facility where it is redissolved in a solvent, or preferably, dissolved or dispersed in water. On drying the adduct at high temperature some of the counterion may be lost by evaporation. It may be necessary to add these materials when redissolving the dried release agent in water.

Optionally, the adduct of this invention may be crosslinked following coating. This is normally not necessary but may be desirable if increased heat stability and higher resistance to humidity and solvents are desirable for some particular application. Suitable chemicals reacting with the carboxyl groups of the urethane oligomer are multivalent metal compounds, such as chromic nitrate, zinc acetate and polyaziridine compounds. N-(2-aminoethyl)-3-aminopropyl trimethoxysilane, an optional co-reactant with the polyisocyanate would also be a crosslinker. The metallic compounds act instantaneously on evaporation of water from a backing member on which it had been coated. Polyisocyanate and polyepoxy compounds react at slower rates. Other chemicals that may be used, which result in multiple carbon-to-carbon double bonds in the urethane, are reacting by oxidative, or "drying", mechanism.

The adduct of this invention can be used alone or mixed with various polymeric film formers. Such compositions are of particular advantage, as satisfactory release and other functional properties in some instances can be provided much more economically, for example, when the substrate coated is relatively porous as is the case of a paper backing member in the manufacture of pressure-sensitive adhesive tape. The release agent is present in the release composition in only minor amounts, usually 1 to 10%. Thus, as the siloxane release agent is the more expensive component of the release compositions, its use therein results in considerable savings. Since the capped isocyanate of this invention needs no cure, it can be intermixed with various film formers including those, which heretofore could not withstand the silicone curing temperatures, and therefore could not be used. Examples of film formers in emulsion form are polyvinyl acetate, ethylene vinylacetate copolymers, polyamides, polyacrylics, polyurethanes, epoxy resins, polyvinyl chloride homo and copolymers, and their mixtures. It is theorized that the composition of this invention migrates to the outer surface of a coating, thus providing the desirable surface characteristics.

The adduct of this invention can be applied to various substrates, such as plastic film, glass fabric, metal foil, paper and latex impregnated paper by various means. Plastic films are usually coated with a #3–20 Meyer rod, #130–250 rotogravure roll or a series of rotating smooth rolls. Where the substrate is fibrous, e.g., papers and textile fabrics, the polymeric material can be applied by such operations as immersion, spraying, brushing, and roll coating. The more complete the coverage the better the results obtained.

After a layer of the solution is coated on the desired substrate, heat, moving air, or their combination may be applied to volatilize water and any solvent, if present, thereby leaving a deposit or coating of the release agent or composition on the substrate. The heat necessary to accomplish the desired evaporation depends on the air volume, air velocity and the coating weight. They can easily be determined by those skilled in the art for any particular situation. The prime consideration is that the volatiles' evaporation be complete.

A further aspect of the invention comprises a pressure-sensitive adhesive product, which includes a backing member, a pressure-sensitive adhesive and the novel release coating. Such products include tapes, labels and write-on office products such as repositionable note pads, sticky pads, STIK-EM® notes and Post-it® notes or pads. The adduct may be applied to these products as release agent, release agent-ink blend for printing and overprint varnish.

The pressure-sensitive adhesive composition may comprise in admixture elastomers, a tackifying resins and additives. The elastomer may be styrene-isoprene or styrene-butadiene block or random copolymers, natural rubber or ethylene-vinylacetate rubber. Other generic adhesives may also be used, such as polyacrylates, polyurethanes and vinyl ether polymers. The adhesive is applied to the backing member in the form of a solvent solution, aqueous emulsion or hot-melt by methods of calendering, extrusion, kiss roll coating, etc. The solvent or water is removed from the adhesive composition by evaporation by heating. The adhesive product is then generally wound on itself for storage and for slitting into rolls or sheeted out into suitable width and length. The coverage of pressure-sensitive adhesive composition (on a dry basis) is preferred to be in the range of between about 0.5–4.0 ounces per square yard but may be outside this range if required for specific purposes.

The invention is more particularly described in the following Examples as a release agent per se or as a component of a release coating composition for pressure-sensitive adhesive tapes. By virtue of its properties, however, the adduct of this invention will be found suitable in numerous applications such as protective film or paper, water repellent coating for masonry, such as concrete, stone, etc. Other applications include coating for fibrous containers, conveyor belts, and various coverings and items which come into contact with such sticky and tacky materials such as bread dough, rubber, candy, plastics, the adhesive under linoleum and tile surface, during manufacture, transportation, and storage of these materials. Other uses include mold release agent and release surface from various substrates; water repellent coating in paper, textile, and metal finishing and antiblock and slip agent for inks and coatings.

The invention will now be further illustrated and described by reference to the following specific non-limiting Examples. The quantities and proportions are expressed in this Application in grams, and percent by weight, unless specifically stated otherwise. The following abbreviations are used:

MEOA: N-methyl-ethanolamine
MPK: methyl-n-propyl ketone
NMP: N-methyl-2-pyrrolidone
PAN: phthalic anhydride
PMA: propyleneglycol methyletheracetate
TDI: 80/20 mixture of 2,4- and 2,6-toluenediisocyanate
SIL1: monocarbinol-terminated silicone with OH equivalent of 600

MEK: methylethyl ketone
TEG: triethylene glycol
PGL: propylene glycol
DEOA: Diethanolamine $(CH_3)_3SiO((CH_3)_2SiO)(CH_3SiO)O(CH_2)_3O(CH_2CH_2O)_{7.6}H$ SIL2: linear dimethylsiloxane oligomer having di-omega groups of $—(CH_2)_3O(CH_2CH_2O)_{15}H$ and OH equivalent of 1150

PODA: polyoxypropylene diamine of the formula $H_2NCHCH_3CH_2(OCH_2CHCH_3)_nNH_2$, and amine equivalent 115
DMEA: N,N'-dimethyl ethanolamine VIS: viscosity   TS: total solids   ST: softening temperature

EXAMPLE 1

This Example illustrates the preparation and evaluation of the product of this invention from the three monomers A, B, and C, wherein the silicone B has only one isocyanate-reactive group.

DEOA, 16.7 (318 mE-OH) was dissolved in a mixture of acetone, 46.7 and NMP, 20, and PAN, 23.1 (156 mM) was sifted in gradually while stirring and cooling externally with ice-water while the internal temperature was maintained below 55° C. (Solution A). Infrared spectrum of the reaction-product confirmed that the reaction product was an amide having carboxyl and hydroxyl groups.

TDI, 30.2 (346 mE-NCO) were charged into a reactor and portion of the above-prepared solution, 59.3 (177 mE-OH), was added slowly while stirring and cooling to maintain 50–55° C. during the reaction. To this solution was than mixed SIL1, 30.0 (50 mE-OH) and the mixture was left to react at 50° C. for four hours to let all the OH groups be consumed. The isocyanate-terminated compound was then capped with the remainder of the Solution A and let react at 50° C. overnight to yield a clear solution. The carboxyl function was than neutralized with DMEA, 9.2 and further diluted with water, 6.9 and methanol, 13.9, to yield a clear solution having TS=62% and VIS=5900 cps. The solid isolated from the solution had ST=110–116° C.

EXAMPLE 2

This Example illustrates the preparation and evaluation of the product of this invention wherein the ion-providing C monomer has only one isocyanate-reactive group and there are two kinds of optional D monomer included: one with one isocyanate-reactive group and another with two isocyanate-reactive groups.

MEOA, 6.8 (92 mM, 93 mE-OH) was dissolved in a mixture of NMP, 54.3 and PMA, 27.2, and PAN, 13.2 (89 mM and 89 mE-COOH) was sifted in gradually while stirring and cooling externally with ice-water while the internal temperature was 50–55° C. Infrared spectrum of the reaction-product confirmed that the reaction product was an amide having carboxyl and hydroxyl groups.

TDI, 39 (447 mE-NCO) were charged into a reactor and the above-prepared solution, mixed with TEG, 10.3 (137 mE-OH) was added slowly while stirring and cooling to maintain 50–55° C. during the reaction. This was followed by stirring in SIL2, 20.1 (19 mE-OH). The mixture was left to react at 60° C. for one hour to let all the OH groups consume. The isocyanate-terminated intermediate was then further reacted at 30–60° C. with PODA, 8 (70 mE-NH) followed by capping and methanol, 3.1 (97 mE-OH) with an additional 1.0 g excess methanol stirred in, and reacted for 2 hours at 55° C. It was then cooled to ambient and mixed with DMEA, 7.9 (89 mM) to yield a clear solution with TS=55%, VIS=5900 cps and ST=86–88° C.

EXAMPLE 3

This Example illustrates the preparation and evaluation of the product of this invention wherein both the silicone monomer B and the ion-providing C monomer have each one isocyanate-reactive group.

MEOA, 9.0 (120 mE-OH) was dissolved in NMP, 81.8 and PAN, 17.7 (117 mM and 117 mE-COOH) was sifted in gradually while stirring and cooling externally with ice-water while the internal temperature was 50–55° C. The solution was then mixed with TEG, 6.0 (80 mE-OH) and gradually added to TDI, 34.5 (396 mE-NCO) and reacted while maintaining 55–60° C. The NCO-functional intermediate was then reacted with SIL1, 20 (35 mE-OH), as in Example 1 and further reacted with PODA, 15.4 (134 mE-NH) as in Example 2. It was then was cooled to ambient and mixed with DMEA, 8.2 (92 mM) to yield a clear solution with TS=55%, VIS=5300 cps and ST=84–87° C.

EXAMPLE 4

This Example illustrates the preparation and evaluation of the product of this invention wherein the amount of the silicone monomer B was reduced to 15% of the solids.

MEOA, 6.8 (91 mM, 91 mE-OH) was dissolved in a mixture of NMP, 53.8 and PMA, 26.9, and PAN, 13.2 (89 mM) was sifted in gradually while stirring and cooling externally with ice-water while the internal temperature was 50–55° C. The solution was then mixed with TEG, 12.0 (160 mE-OH) and reacted with TDI, 41.5 (476 mE-NCO) as in Example 3. The NCO-functional intermediate was then reacted with SIL2, 15 (14 mE-OH), further reacted with PODA, 8.0 (70 mE-NH), capped with methanol, 2.5 (108 mE-OH) and an additional 1.0 g methanol was mixed into the solution, all as in Example 3. It was then cooled to ambient and mixed with DMEA, 5.9 (66 mM) to yield a clear solution with TS=55%, VIS=7300 cps and ST=88–89° C.

EXAMPLE 5

This Example illustrates the preparation and evaluation of the product of this invention wherein the amount of the silicone B was further reduced to 11% of the adduct.

MEOA, 8.0 (107 mE-OH) was dissolved in a mixture of NMP, 48.6 and PMA, 32.2, and PAN, 15.6 (106 mM) was sifted in gradually while stirring and cooling externally with ice-water while the internal temperature was 50–55° C. The Packaging Tape: "Super Strength Packaging Tape" manufactured by 3M Company, 2" wide, believed to have a 50 micron thick BOPP backing and a hot melt adhesive based on a styrene-isoprene-styrene block copolymer mixed with a high melting temperature terpene resin.

Masking Tape: Anchor tape #504, 1" wide, believed to have an adhesive based on natural rubber and SBR.

The average degree of polymerization (DP) and weight average molecular weights ($M_w$) were calculated from the stoichiometry of the reactants using Carother's equations.

T-peel values from the release agents (RA) and adhesion to steel (ASS) are reported in gram force units in Table 1. The analysis of the results show that the release agents of this invention are in general better than the polymeric release agent disclosed in the prior art.

TABLE 1

| EX. | % SIL1 | % SIL2 | DP | $M_w$ | % TS | Packaging Tape T-Peel | Packaging Tape ASS | Masking Tape T-Peel | Masking Tape ASS |
|---|---|---|---|---|---|---|---|---|---|
| 1 | 20 | — | 15 | 5100 | 62 | 450 | 3.1 | 320 | 1.5 |
| 2 | — | 20 | 4 | 2400 | 55 | 210 | 2.9 | 180 | 1.3 |
| 3 | 19 | — | 6 | 1600 | 55 | 330 | 3.0 | 320 | 1.4 |
| 4 | — | 15 | 4 | 1900 | 55 | 230 | 3.0 | 200 | 1.5 |
| 5 | — | 11 | 4 | 1600 | 55 | 260 | 3.1 | 220 | 1.5 |
| Sengupta | — | | 50+ | 20000–2000000 | 26–37 | — | — | — | — |
| Shores | 40 | — | Higher than Sengupta | | 29 | 610 | 3.0 | 280 | 1.3 |
| NO RA | — | — | — | | — | 1600 | Adhesive Delam. | 1100 | Adh. Del. | solution was then mixed with TEG, 11.8 (157 mE-OH) and reacted with TDI, 42.0 (482 mE-NCO) as in Example 3. The NCO-functional intermediate was then reacted with SIL2, 11 (10 mE-OH), further reacted with PODA, 8.3 (73 mE-NH), capped with methanol, 3.3 (103 mE-OH) and an additional 1.0 g methanol was mixed into the solution, all as in Example 3. The solution was cooled to ambient and mixed with DMEA, 7.1 (78 mM) to yield a clear solution with AC=55%, VIS=8300 cps and ST=86–92° C.

EXAMPLE 6

This Example illustrates the evaluation, as release agents in adhesive tapes, of the products prepared in the previous Examples and compares them to the prior art release agent.

A biaxially oriented polypropylene (BOPP) film, 30 micron thick, was corona treated on both sides to yield surfaces of 42 dynes/cm surface tension. It was then coated on one side with 3% aqueous solutions of the urethanes of Examples (EX.) 1–5 using a #6 Meyer rod and dried in an oven at 65° C. for 10 minutes. The release-coated films were than laminated with commercially available pressure sensitive adhesive tapes and submitted to accelerated aging at 72° C. for 16 hours. The tapes were then peeled from the films at a T-peel mode at a speed of 25 cm/min and the force required to peel was measured. The peeled tapes were then laminated to a finely polished flat stainless steel plate, peeled at an 180° angle and the peel force measured. For comparison, test specimen were made up similarly by laminating the tapes to uncoated BOPP, designated as NO RA, and to BOPP coated with the release agent composition of U.S. Pat. No. 5,356,706 (Shores) having 40% silicone. The following adhesive tapes were laminated to the release-coated BOPP:

EXAMPLE 7

This Example shows that incorporating a small amount of release agent of this invention blended with a film former yields good unwind characteristics in adhesive tapes.

The release agent of Example 2 was blended with an emulsion of polyvinyl acetate in water at the 10% (dry/dry) level.

The formulation was coated onto a latex impregnated paper backing member in an amount to provide a dry weight of 14 g/m². This was accomplished by heating the coated paper to remove water and fuse the backsize.

The backsize coated backing member was then coated with a hot melt adhesive formulated with a styrene-isoprene-styrene block copolymer, and tackified with rosin ester tackifiers, after which the mass coated sheet was slit to 25 mm wide rolls of tape. These were oven aged for 16 hours at 72° C. and tested for unwind adhesion and adhesion to stainless steel. The results are indicated below:

Unwind Adhesion (unwinding speed=350 ft/min): 240 g/25 mm

Adhesion to SS: 920 g/25 mm.

EXAMPLE 8

This Example illustrates the good release characteristics obtainable with pressure sensitive adhesive-coated notepads by using the composition of this invention.

Clay coated craft paper having thickness of 10.9 kg/276 m² (24 lb/ream) was coated with a 2% TS solution in water of the urethane solution of Example 5 using a #6 Meyer rod and dried in a 72° C. oven for 5 minutes. The coated paper was laminated with a 25 mm strip of a pressure sensitive adhesive-coated paper taken from a note pad manufactured by 3M Company under the Post-it brand name. A similar laminate was made with the same craft paper not coated with the urethane solution of this invention (Control).

The laminate was aged in an oven at 50° C. for 2 weeks and tested for T-peel adhesion at a separation rate of 30 mm/min (12"/min). The force required to separate the laminates was 8 g/25 mm for the release-coated paper and 80 g/25 mm for the uncoated paper.

I claim:

1. Water-soluble or dispersible reaction product of a composition comprising in admixture
    A. Polyisocyanate,
    B. Silicone having dimethylsiloxane segment and one or more isocyanate-reactive group,
    C. Reactant with one or more isocyanate-reactive group, and one or more ionizable group, and
    D. Compound providing counterion for said ionizable group; and
wherein either silicone B, or reactant C, or both, have a single isocyanate-reactive group; and wherein the weight average molecular weight of said reaction product is about 600–20,000.

2. Reaction product according to claim 1 wherein said reactant is selected from the group consisting of 2,2'-dimethylol propionic acid, hydroxyacetic acid, aminoacetic acid, tartaric acid, lysine, N-2-aminoethyl-2-aminoethane sulfonic acid, the propoxylated adduct of 2-butene-1,4-diol with sodium bisulfite, and combinations thereof.

3. Reaction product according to claim 1 wherein said counterion is provided by a compound having an amine, halide, hydroxide or a carboxyl group.

4. Reaction product, according to claim 1, having weight average molecular weight about 800–10,000.

5. Reaction product, according to claim 4, having weight average molecular weight about 1,000–5,000.

6. Reaction product, according to claim 1, coated on a substrate.

7. Reaction product, according to claim 6, wherein the coating on said substrate is a release agent in an adhesive-coated product.

8. Reaction product, according to claim 1, as a coating selected from the group consisting of ink modifier, overprint varnish, finish for fiber, fabric or paper products, and mold release agent.

9. Reaction product, according to claim 1, having dimethylsiloxane content 1–17%.

10. Reaction, according to claim 1, wherein said counterion is an amine.

11. Water-soluble or dispersible reaction product of a composition comprising in admixture:
    A. Polyisocyanate,
    B. Silicone having dimethylsiloxane segment and one or more isocyanate-reactive group,
    C. Carboxylic acid containing reactant that is the reaction product of a cyclic monoanhydride with a compound having at least one anhydride-reactive group and at least one isocyanate-reactive group, and
    D. Compound providing counterion for said ionizable group.

12. Reaction product according to claim 11 wherein said dimethylsiloxane segment consists of 1–25 dimethylsiloxane units, the isocyanate-reactive groups are selected from the group consisting of hydroxyl, primary amino, secondary amino, carboxyl and thiol, or mixtures thereof, and bonded to said dimethylsiloxane segment by an intermediate organic group.

13. Reaction product according to claim 12 wherein said intermediate organic group is alkylene, alkyleneoxy or polyester.

14. Reaction product according to claim 11 wherein said ionizable group is provided by a compound selected from the group consisting of carboxylic acid, sulfonic acid, phosphonic acid, tertiary amine and polyamine.

15. Reaction product according to claim 11 wherein said polyisocyanate is selected from the group consisting of isomers of toluene diisocyanate, isomers of methylene-bis-phenylisocyanate, polymeric methylene-bis-phenyliocyanate, tetramethyl-m-xylylene diisocyanate, isophorone diisocyanate, m-tetramethylxylylene diisocyanate and mixtures thereof.

16. Reaction product according to claim 11 wherein said multifunctional compound is selected from the group consisting of polyamine, polyol, amino alcohol, amino acid and hydroxyacid.

17. Reaction product according to claim 11 wherein said cyclic monoanhydride is either phthalic anhydride or hydrogenated phthalic anhydride and said compound is selected from the group consisting of 2-ethanol amine, N-methyl-2-ethanolamine, diethanol amine, diisopropanol amine, 2-amino-2-ethyl-1,3-propanediol and 4-aminobenzoic acid.

18. Reaction product, according to claim 11, coated on a substrate as release agent in an adhesive-coated product.

19. Release agent, according to claim 18, blended with a film-forming polymer.

20. Blend, according to claim 19, wherein said film-forming polymer is selected from the group consisting of vinylacetate homo or copolymers, polyacrylates, polyvinyl chloride homo and copolymers, polyesters, amino resins and epoxy resins.

21. Reaction product, according to claim 11, as a coating selected from the group consisting of ink, overprint varnish, paint, finish material for fiber, fabrics or paper products, and mold release agent.

22. Reaction product, according to claim 11, having weight average molecular weight about 800–20,000.

23. Reaction product, according to claim 22, having weight average molecular weight about 800–10,000.

24. Reaction product, according to claim 23, having weight average molecular weight about 1,00–5,000.

25. Reaction product, according to claim 11 with dimethylsiloxane content 1–17%.

26. Water-soluble or dispersible reaction product of a composition comprising in admixture:
    A. Polyisocyanate,
    B. Silicone having dimethylsiloxane segment and one or more isocyanate-reactive group,
    C. Reactant with one or more isocyanate-reactive group, and one or more ionizable group, and
    D. Compound providing counterion for said ionizable group; and
wherein either silicone B, or reactant C, or both, have a single isocyanate-reactive group, and wherein the average degree of polymerization is 3–20.

27. Reaction product, according to claim 26, having average degree of polymerization about 4–10.

28. Reaction product, according to claim 26, coated on a substrate as release agent in an adhesive-coated product.

29. Reaction product, according to claim 26, having dimethylsiloxane content 1–17%.

30. Solution or dispersion in water and negatively or positively charged reaction product of a composition comprising in admixture:
    A. Polyisocyanate and
    B. Silicone with dimethylsiloxane segment having one or more isocyanate-reactive group and one or more ionizable group that does not react with said polyisocyanate.

* * * * *